United States Patent
Wang et al.

(10) Patent No.: US 11,933,231 B2
(45) Date of Patent: Mar. 19, 2024

(54) METHODS AND SYSTEMS FOR TUNING A GAS TURBINE ENGINE

(71) Applicant: Power Systems Mfg., LLC, Juipter, FL (US)

(72) Inventors: Wenping Wang, Jupiter, FL (US);
Matthew Yaquinto, Jupiter, FL (US);
Nicolas Demougeot, Jupiter, FL (US);
Alex Steinbrenner, Jupiter, FL (US);
Cory Dodson, Jupiter, FL (US); Jaime Serrano, Jupiter, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 17 days.

(21) Appl. No.: 17/665,935

(22) Filed: Feb. 7, 2022

(65) Prior Publication Data
US 2023/0250765 A1 Aug. 10, 2023

(51) Int. Cl.
*F02C 9/28* (2006.01)
(52) U.S. Cl.
CPC ............ *F02C 9/28* (2013.01); *F05D 2270/07* (2013.01); *F05D 2270/20* (2013.01)
(58) Field of Classification Search
CPC ....................................................... F02C 9/28
See application file for complete search history.

(56) References Cited

U.S. PATENT DOCUMENTS

| 2014/0020400 A1* | 1/2014 | Ceccherini | F02C 9/00 60/773 |
| 2020/0102902 A1* | 4/2020 | Piche | F02D 41/1453 |

* cited by examiner

*Primary Examiner* — Scott J Walthour
(74) *Attorney, Agent, or Firm* — Hovey Williams LLP

(57) ABSTRACT

A method for tuning a gas turbine engine includes performing a sensitivity step process on a tuning parameter. An operating parameter is monitored. The gas turbine is operating in a first operational state and the operating parameter has an initial condition. The tuning parameter is selected for adjustment. The tuning parameter is adjusted by a predefined amount. The adjustment includes applying an incremental bias adjustment to a fuel flow fraction schedule. The gas turbine engine transitions to a second operational state, wherein the operating parameter has an adjusted condition. The adjusted condition and the initial condition of the operating parameter are applied to a cost function. It is then determined that the cost function results in a cost function value indicative of a decreased cost. The incremental bias adjustment and the cost function value is written to a bias look-up table and are associated with the selected tuning parameter.

30 Claims, 6 Drawing Sheets

METHODS AND SYSTEMS FOR TUNING A GAS TURBINE ENGINE

BACKGROUND

The present invention relates generally to gas turbine engines, and more particularly, to systems and methods for use in tuning gas turbine engines.

Gas turbine engines operate to produce mechanical work or thrust. The shaft of the gas turbine engine may be coupled to a generator. Mechanical energy of the shaft is used to drive a generator to supply electricity. Demand for the electricity causes a draw of electrical current from the generator, which in turn causes a load to be applied to the gas turbine engine. This load is essentially a resistance applied to the generator that the gas turbine must overcome to maintain an electrical output of the generator.

Typically, control systems are used to regulate the operation of the gas turbine engine. The control system receives large amounts of data that relate to current operating conditions of the gas turbine engine including pressures, temperatures, fuel flow rates, and engine frequencies. In response, the control system adjusts the inputs of the gas turbine engine, thereby changing performance of the gas turbine engine based on the data in light of various look-up tables associated with the control system. Over time, the performance of the gas turbine engine may fall outside a preferred operating range due to mechanical degradation of the gas turbine engine or changes in operational conditions such as ambient temperature or fuel constituents. As such, multiple manual tunings are required to update the control system to keep the gas turbine engine operating in a near optimal manner. Manual-tuning is labor intensive and can create business-related inefficiencies, such as extended down-time of the gas turbine engine and operator error in the course of tuning, resulting in sub-optimal operation. In addition, because the gas turbine engine continues to wear down and/or operating conditions may rapidly change, manual tuning is unable to maintain optimal tuning.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a method is provided. The method is implemented by a processor for tuning a gas turbine engine. The method includes performing a sensitivity step process on a tuning parameter of the gas turbine engine. The sensitivity step process includes monitoring an operating parameter of the gas turbine engine. The gas turbine is operating in a first operational state and the operating parameter has an initial condition. The process includes selecting the tuning parameter of the gas turbine engine for adjustment and adjusting the selected tuning parameter of the gas turbine engine by a predefined amount to generate a biased tuning parameter. The adjusting step includes applying an incremental bias adjustment to a fuel flow fraction schedule. The process further includes adjusting operation of the gas turbine engine to a second operational state based on the biased tuning parameter, wherein the operating parameter has an adjusted condition. Moreover, the process includes applying the adjusted condition and the initial condition of the operating parameter to a cost function and determining that the cost function results in a cost function value indicative of a decreased cost. The process also includes writing the incremental bias adjustment and the cost function value to a bias look-up table. The incremental bias adjustment and the cost function value are associated with the selected tuning parameter.

In another aspect, a system tuning a gas turbine engine is provided. The system includes one or more sensors coupled to the gas turbine engine. The one or more sensors are configured to transmit one or more operating parameters associated with the gas turbine engine to an auto-tune controller. The system also includes an auto-tune controller comprising a memory and a processor. The memory stores computer-executable instructions that, when executed by the processor, cause the processor to perform operations including performing a sensitivity step process on a tuning parameter of the gas turbine engine comprising. The sensitivity step process includes monitoring an operating parameter of the gas turbine engine. The gas turbine is operating in a first operational state and the operating parameter has an initial condition. The process includes selecting the tuning parameter of the gas turbine engine for adjustment and adjusting the selected tuning parameter of the gas turbine engine by a predefined amount to generate a biased tuning parameter. The adjusting step includes applying an incremental bias adjustment to a fuel flow fraction schedule. The process further includes adjusting operation of the gas turbine engine to a second operational state based on the biased tuning parameter, wherein the operating parameter has an adjusted condition. Moreover, the process includes applying the adjusted condition and the initial condition of the operating parameter to a cost function and determining that the cost function results in a cost function value indicative of a decreased cost. The process also includes writing the incremental bias adjustment and the cost function value to a bias look-up table. The incremental bias adjustment and the cost function value are associated with the selected tuning parameter.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Broadly, to facilitate tuning a gas turbine engine, an auto-tune controller is operable to adjust a plurality of tuning parameters (e.g., fuel splits) and monitor any changes made to one or more operating parameters of the gas turbine engine (e.g., Lean Blow Out (LBO), Cold Tone (CT), and Hot Tone (HT)). Changes to the parameters are applied to a cost function to determine which tuning parameter adjustment results in a decreased value of the cost function. The auto-tune controller makes iterative step adjustments to the tuning parameters and records the results in a look-up table. After completing the step adjustments for each tuning parameter and recording the results, the auto-tune controller determines which combination of changes results in the lowest cost function value. The auto-tune controller then completes a single improvement step where it applies each bias adjustment of the combination to the control system of the gas turbine engine, resulting in an operational state that has a reduced "cost." The auto-tune controller then repeats the entire tuning process, thereby adjusting operation of the gas turbine engine such that the cost function is at a minimum value.

Figure 1:
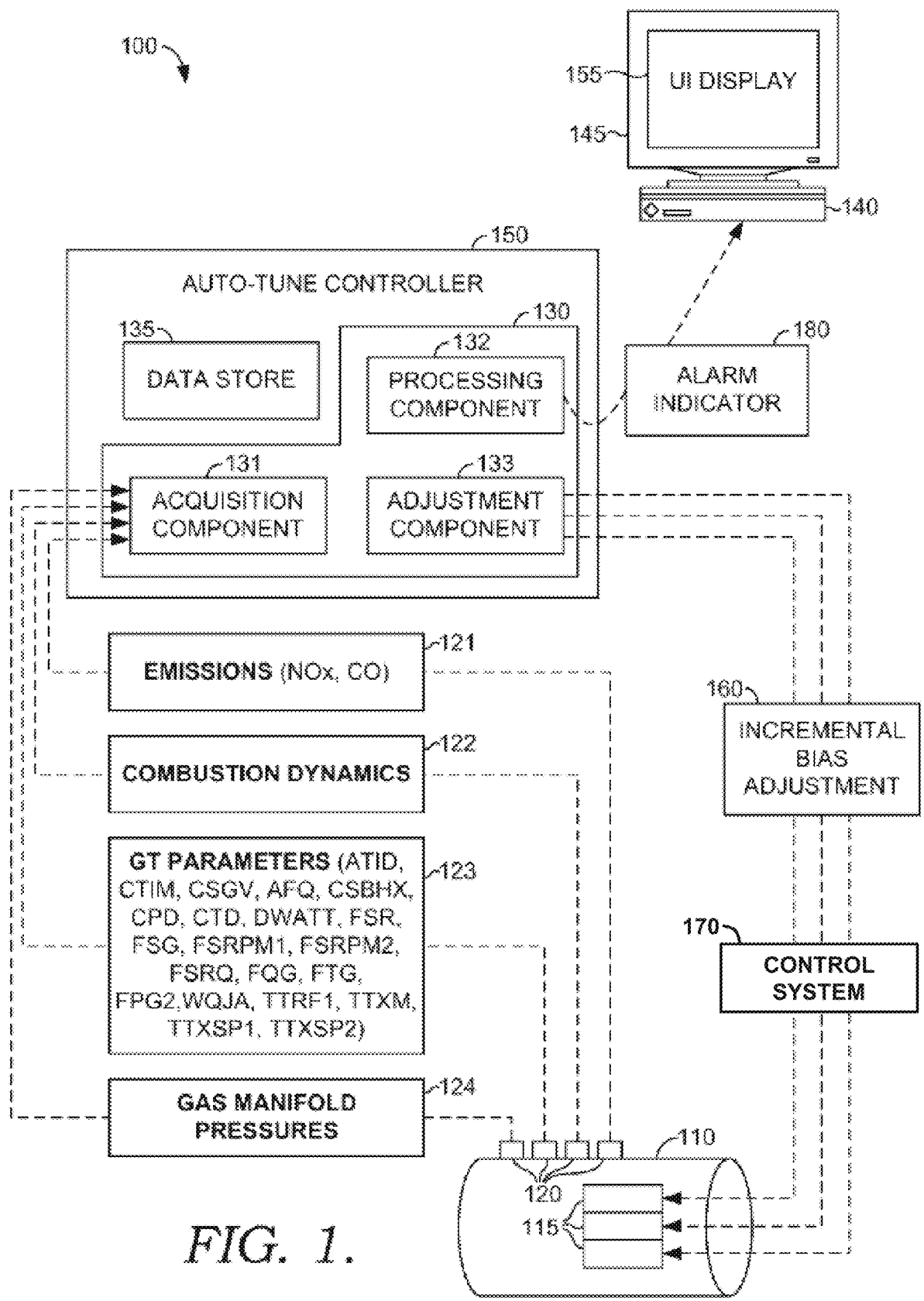
FIG. 1 is a block diagram of a tuning environment suitable for use in embodiments of the present invention.

FIG. 1 is a block diagram of a tuning environment 100 suitable for use in embodiments of the present invention. The tuning environment includes a gas turbine engine 110. The gas turbine engine 110 includes a plurality of combustors 115. Generally, for the purpose of discussion, the gas turbine engine 110 may include dry low emissions (DLE) or dry low $NO_x$ (DLN) combustors. In one embodiment, the combustors 115 may be arranged in a can-annular configuration about the gas turbine engine 110. For example, in one aspect of the present invention, the gas turbine engine 110 includes a heavy-duty gas turbine engine that may be provided with six (6) to eighteen (18) individual combustors. In other examples, the gas turbine engine 110 may include a light-duty gas turbine engine provided with fewer combustors. Consequently, based on the type of gas turbine engine, there may be various different fuel circuits utilized for operating the gas turbine engine 110. Further, there may be individual fuel circuits that correspond with each of the plurality of combustors 115 attached to the gas turbine engine 110. It should be appreciated and understood that an auto-tune controller 150, and a tuning process executed thereby, can be applied to any number of configurations of gas turbine engines and that the type or model of gas turbine engines described herein should not be construed as limiting the scope of the present invention.

Figure 2:
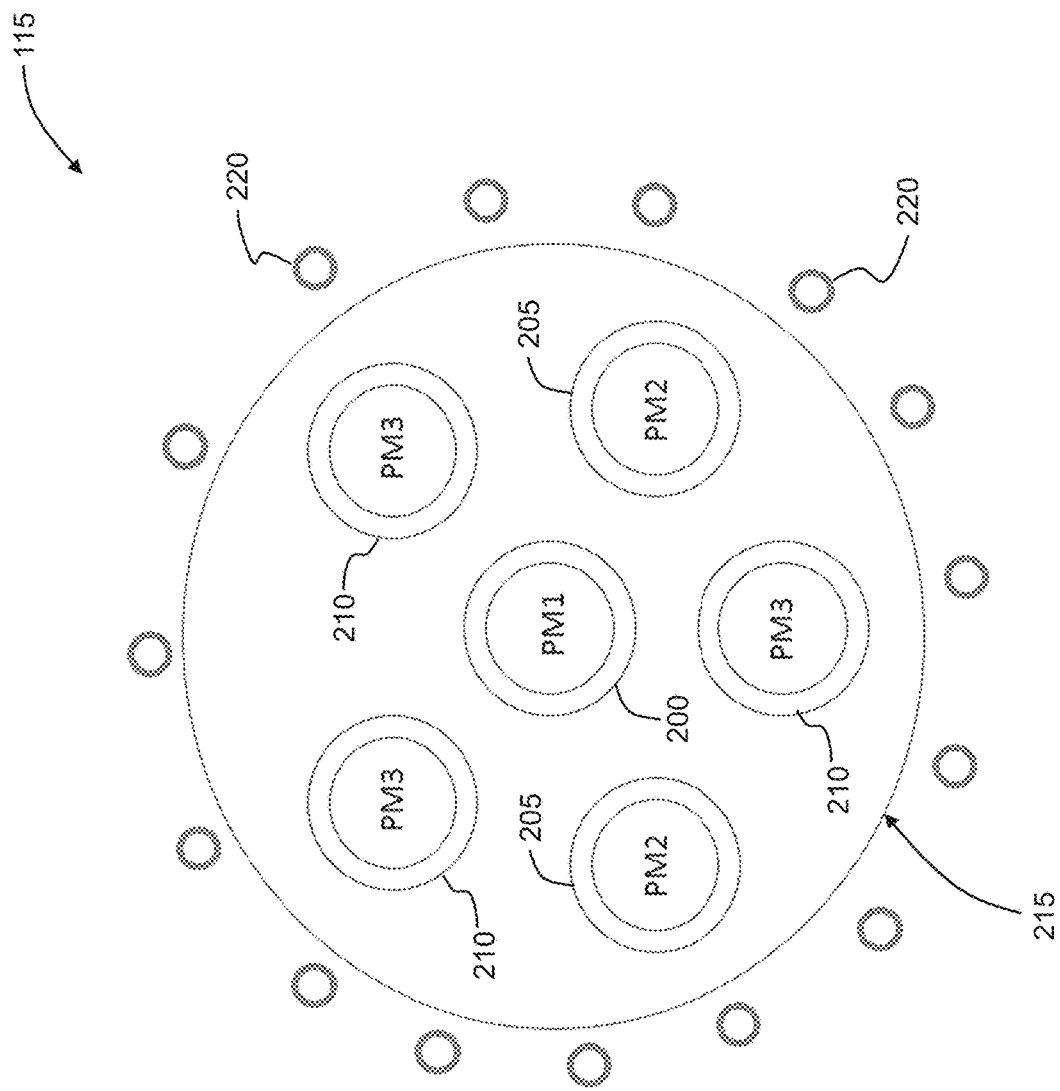
FIG. 2 is a schematic end view of an exemplary combustor of a gas turbine engine of the system of FIG. 1, in accordance with one aspect of the present invention.

FIG. 2 is a schematic end view of an exemplary combustor 115, in accordance with one aspect of the present invention. The example gas turbine engine 110 employs a plurality of DLE or DLN combustors 115. Each combustor 115 includes six fuel nozzles 200, 205, and 210 per combustion can 215; five located radially and one located in the center. Each combustor 115 operates as a fully premixed combustor. The center nozzle 200 may also be referred to as PM1 (Premix 1), two (2) of the outer nozzles 205 may be referred to as PM2 (Premix 2), and the remaining three (3) outer nozzles 210 may be referred to as PM3 (Premix 3). Another fuel passage, located in an airflow upstream of the premix nozzles 200, 205, and 210, circumferentially around the combustion can 215, may be referred to as the quaternary fuel pegs 220. In a DLN combustion system, typically there are four gas fuel system manifolds (not shown), each associated with the fuel nozzles described above: Premix 1, Premix 2, Premix 3, and Quaternary. A plurality of gas control valves (GCVs) regulate a percentage of a total fuel flow delivered to each of the gas fuel system manifolds, and in turn, the fuel nozzles 200, 205, and 210 and the quaternary fuel pegs 220.

Referring back to FIG. 1, in the example embodiment, the combustors 115 (i.e., the dry low emissions combustors) may be prone to elevated levels of pressure fluctuation within the combustion can 215. These pressure fluctuations are referred to as "combustion dynamics" 122. Left alone, combustion dynamics 122 can have a dramatic impact on the integrity and life of the combustor 115, eventually leading to catastrophic failure of the gas turbine engine 110. The combustion dynamics 122 may include, for example, one or more dynamic pressures within the combustor 115, such as Lean Blow Out (LBO), Cold Tone (CT), and Hot Tone (HT).

Further, when outside an optimal operating range, the gas turbine engine 110 may emit emissions with properties that are unacceptable (i.e., exceed a predefined threshold). Unacceptable emissions may include, but are not limited to, nitrogen oxides ($NO_x$) and carbon monoxide (CO). In some embodiments, these properties of the gas turbine engine 110 emissions may include "emission composition" 121, which is measured periodically by a monitoring device (e.g., continuous emission monitoring system (CEMS)) (not shown). By way of example, the emission composition 121 may be measured in units of parts per million (ppm) for each of $NO_x$ and CO, while $O_2$ may be measured in percent (%) composition. As such, emission composition 121 relates to an amount of pollutants that are generated by the gas turbine engine 110. Once the emission composition 121 is measured, it is compared against a critical (maximum/minimum) value to determine whether the emission composition 121 is actually unacceptable.

The effects of elevated combustion dynamics 122 and/or unacceptable emission compositions 121 may be mitigated or cured by adjusting fuel flow fractions of a combustor gas flow between the several groups of fuel nozzles 200, 205, and 210 within the plurality of combustors 115. More particularly, a control system 170 (or, in some instances, a fuel controller (not shown)) operating in the tuning environment 100 may generate and implement fuel split commands that affect amounts of fuel flowing to the various fuel circuits of the combustor 115. The fuel split commands may relate, for example, to a fuel split percentage for each respective fuel circuit. The fuel split percentage for a respective fuel circuit may define a selected percentage of the total amount of fuel delivered to the combustor 115 supplied through a particular fuel circuit. Fuel flow fraction schedules, which govern the fuel flow fraction for each fuel circuit, are typically hard coded into the control system 170 of gas turbine engine 110 and can be used to control monitored turbine parameters such as exhaust temperature, inlet guide vane angles, fuel temperatures and properties, etc.

The different fuel flows to several groups of fuel nozzles 200, 205, and 210 within the plurality of combustors 115 are occasionally tuned to ensure that acceptable levels (conventionally low levels) of the combustion dynamics 122 are maintained while, at the same time, promoting acceptable emission compositions 121.

As discussed herein, an automatic tuning control system, or the auto-tune controller 150, is used to assess the state of the gas turbine engine 110 and the plurality of combustors 115 in terms of parameters such as the combustion dynamics 122, air flow, fuel flows, emission composition 121, and a pressure distribution. Based on these parameters, adequate fuel flow fractions are determined by incrementally adjusting the fuel flow fractions to minimize a "cost function" subject to a set of constraints, as described herein. Accordingly, embodiments of the present invention concern the auto-tune controller 150 and the associated tuning process that enables automatic tuning of the combustion dynamics 122 and emission composition 121 using incremental changes of the fuel flow fraction to minimize a cost function.

The exemplary tuning environment 100 includes the auto-tune controller 150, a computing device 140 operably coupled to a presentation device 145 for displaying a user interface (UI) display 155, and the gas turbine engine 110. The auto-tune controller 150 includes a data store 135 (i.e., a computer-readable medium) and a processing unit 130 that supports the execution of an acquisition component 131, a processing component 132, and an adjustment component 133. Generally, the processing unit 130 is embodied as some form of a computing unit (e.g., a processor, central processing unit, microprocessor, etc.) to support operations of the component(s) 131, 132, and 133 running thereon.

Generally, the data store 135 is configured to store information associated with the tuning process or data generated upon monitoring the gas turbine engine 110. In various embodiments, such information may include, without limitation, measurement data (e.g., measurements 121, 122, 123, and 124) provided by a plurality of sensors 120 coupled to the gas turbine engine 110. In addition, the data store 135 may be configured to be searchable for suitable access of stored information. For instance, the data store 135 may be searchable for dynamic schedules, such as a fuel flow fraction schedule in order to determine a fuel flow fraction to implement upon comparing the measured combustion dynamics 122 to corresponding predetermined limit(s) and/or upon comparing the measured emissions compositions 121 to corresponding critical values, respectively. It will be understood and appreciated that the information stored in the data store 135 may be configurable and may include any information relevant to the tuning process. The content and volume of such information are not intended to limit the scope of embodiments of the present invention.

In the exemplary embodiment, the auto-tune controller 150 records one or more look-up tables (e.g., utilizing the data store 135). The look-up tables may include, for example, various information related to operating conditions of the gas turbine engine 110 and combustors 115 attached thereto. By way of example, the look-up tables may include one or more fuel split bias values for applying to fuel split values in the hardcoded fuel flow fraction schedules, which define a fuel flow fraction for a given operating mode of the gas turbine engine 110. Upon performing the process of automatically tuning the gas turbine engine 110, the auto-tune controller 150 may be automatically reprogrammed to record aspects of the tuning process in the look-up tables. That is, the fuel split bias values in the look-up table may be written and/or altered, for example, via one or more recorded incremental bias values, to reflect occurrences during, and results from, the tuning process. Advantageously, the fuel split bias values may be accessed during a subsequent tuning procedure to facilitate making each subsequent tuning more efficient (e.g., reduce the number of fuel flow adjustment increments needed to bring a condition to a predetermine limit). In this way, the look-up table can be automatically developed through the incremental adjustment of one tuning parameter at a time. Since the incremental adjustment is stored, for example as a bias value, in the look-up tables, the auto-tune controller 150 learns the optimum tuning performance for any particular operating mode of the gas turbine engine 110.

The control system 170 operating in the tuning environment 100 is used to assess the state of the gas turbine engine 110 and the combustor 115 in terms of parameters such as the combustion dynamics 122, emission compositions 121, gas turbine parameters 123, and gas manifold pressures 124. As discussed above, these parameters may be monitored by the plurality of sensors 120 to detect various operating conditions of the gas turbine engine 110 and sense various environmental parameters/conditions. For example, one or more temperature sensors may monitor an ambient air temperature at the gas turbine engine 110, a compressor discharge temperature, and an exhaust gas temperature, among various other temperatures. Pressure sensors may monitor, for example, static and dynamic pressure levels at the compressor inlet and outlet, and a gas turbine exhaust, as well as at other locations in the gas turbine engine 110.

For example, as further described herein, the plurality of sensors 120 may include a first pressure sensor operable to provide a first pressure signal (such as PX36A) characteristic of a dynamic pressure within the combustor 115. In addition, the plurality of sensors 120 may include a second pressure sensor operable to provide a second pressure signal (such as PX36B) characteristic of a dynamic pressure within the combustor 115. The multiple pressure sensors are used in the control system 28 for reliability and accuracy. The plurality of sensors 120 may also include flow sensors, speed sensors, flame detector sensors, valve position sensors, and guide vane angle sensors that sense various operational parameters of the gas turbine engine 110. In certain aspects of the present invention, one or more emission sensors may be provided to measure emission compositions 121, for example, in the exhaust gas of the gas turbine engine 110.

Based on these parameters, in the example embodiment, one or more fuel splits (i.e., tuning parameters) are adjusted incrementally until the cost function is minimized. The cost function is generally a mathematical representation of a gas turbine performance objective, and the constraints are limits or boundaries within which the gas turbine engine 110 must operate. For example, the constraints may include the emission composition 121 and the combustion dynamics 122. In an example, to minimize the emission composition 121 (e.g., $NO_x$ and/or CO), the cost function includes a term that decreases as the level of emission composition 121 decreases. In the example embodiment, "gradient descent" optimization is used. Gradient descent optimization uses a slope of the operational state (i.e., cost function) with respect to the change of each tuning parameter (e.g., fuel splits) to estimate magnitude and direction of changes that lead toward a minimum of the cost function. It should be understood that a number of different optimization techniques may be used depending on the form of the model and the costs and constraints. For example, it is contemplated that the present invention may be implemented by using a variety of different types of optimization approaches. The optimization approaches may include, for example, linear programming, quadratic programming, integer programming, fractional programming, nonlinear programming, stochastic programming, global optimization, and/or particle swarm optimization.

Typically, an alarm, represented schematically by alarm indicator 180, is set or tripped upon detecting that an amplitude of a pressure pulse (i.e., measured combustion dynamics 122) surpasses a predetermined upper or lower limit and/or upon recognizing that the composition of the combustor emissions has exceeded a particular critical value. The control system 170 may adjust one or more components and/or tuning parameters of the gas turbine engine 110 to remove the alarm. However, the gas turbine engine 110 may not be performing optimally even though it is not in an alarm state. Accordingly, embodiments of the present invention concern the auto-tune controller 150, as well as the associated tuning process, that enables continuous adjustment of one or more operating parameters of the gas turbine engine 110 to minimize the cost function, thereby assuring the gas turbine engine 110 is operating at its most optimal state. The auto-tune controller 150 achieves an optimal tuning (i.e., minimized cost function) by using incremental changes of a plurality of fuel splits of the combustors 115 while maintaining the measured emissions compositions 121 and measured combustion dynamics 122 within predetermined limits.

As used herein, the term "parameter" refers to characteristics that can be used to define the operating conditions of the gas turbine engine 110, such as temperatures, pressures, emissions, and/or fuel flows at defined locations within the gas turbine engine 110. Some parameters are measured, i.e., are sensed and are directly known, while other parameters are calculated by a model and are thus estimated and indirectly known. Some parameters may be initially input by a user to the auto-tune controller 150 and/or the control system 170. The measured, estimated, or user input parameters represent a given operating state of the gas turbine engine 110.

An overall tuning process carried out by the auto-tune controller 150 may comprise one or more of the steps described below. Initially, in one embodiment, various configurations of combustion dynamics 122 and/or emissions compositions 121 of the combustor 115 are monitored and recorded. Some of these recorded signals may be passed through a Fourier Transform or another transformative operation, where the first and second pressure signals are converted into an amplitude versus frequency data format or spectrum. For the pressure signals, the amplitude, values, and frequencies may be compared against a predetermined upper or lower limit for, e.g., a predefined frequency band, while the emission-composition parameters may be compared against predefined critical values. The predetermined limit is generally defined in terms of pounds per square inch (psi) for a predefined frequency bands, while the critical values are defined in terms of parts per million (ppm) or percentage. However, in other instances, the predetermined limits and critical values may be expressed in other terms or units, where other types of devices are used to measure performance of the combustor 115 (e.g., accelerometers).

The auto-tune controller 150 performs one or more sensitivity steps to determine the effect of the respective sensitivity step on the operation of the gas turbine engine 110. Each sensitivity step, for example, includes a bias adjustment of a selected tuning parameter of the gas turbine engine 110, where each step is generally a small, fixed incremental adjustment. In one example embodiment, the sensitivity step includes about a twenty-five hundredths of a percent (0.25%) change. The auto-tune controller 150 may apply an incremental bias adjustment 160 to the control system 170 to adjust a fuel flow fraction (e.g., a fuel split value) to the center nozzle 200 (i.e., the PM1 fuel nozzle) of the combustor 115. Namely, adding the bias value may be accomplished by the adjustment component 133 transmitting an incremental bias adjustment 160 to the control system 170 to adjust a fuel flow to at least one of the fuel nozzles 200, 205, 210 of the combustor 115. The incremental bias adjustment 160 causes the performance of the gas turbine engine 110 to change slightly from its initial state.

Upon applying the incremental bias adjustment 160, the auto-tune controller 150 waits a predetermined time period before acquiring and processing data extracted from the gas turbine engine 110. Waiting the predetermined time period ensures that the gas turbine engine 110 reaches a stable state before the auto-tune controller 150 checks to determine the effect of adjusting the fuel flow fraction. In example embodiments, the predetermined time period between adjustment and measurement/analysis may vary based on the type of parameter, or measured data, being processed. For example, the time period required to stabilize combustion dynamics 122 may be less that the time period required to stabilize emission composition 121.

The auto-tune controller 150 then determines a 'cost' of applying the incremental bias adjustment 160 by applying the cost function to the changed parameter (e.g., $NO_x$, Lean Blow Out (LBO), Cold Tone (CT), Hot Tone (HT)). The cost function is an equation that includes all factors that influence a desired outcome. For example:

$$\varphi = f(NOx, LBO, CT, HT, \ldots)$$

In the example embodiment, the cost function represents how "good" the operational state of the gas turbine engine 110 is by considering the indicated values of emission composition 121 and combustion dynamics 122. The gas turbine engine 110 is said to be running optimally when the cost function is at a minimum value. The down selected cost function, $\varphi$, is depicted below.

$$\varphi = \sum_{i=0}^{n} W_i \left( \frac{Para_i - Para_{i_{Target}}}{N_i} \right)^2$$

In the example cost function, $W_i$ is a weighting factor used to determine the importance of each term (e.g., $NO_x$, Lean Blow Out (LBO), Cold Tone (CT), Hot Tone (HT), etc.). For example, in some embodiments, a user may wish to place more or less weight on a selected term to emphasize/deemphasize that term relative to the other terms. $N_i$ is a normalization factor used to ensure that each term has the same order of magnitude. Para 1 is the parameter of interest, like $NO_x$, Lean Blow Out (LBO), Cold Tone (CT), Hot Tone (HT), etc. at its initial value. $Para_{i_{Target}}$ is the parameter of interest, like $NO_x$, LBO, Hot Tones, etc. at its changed value. The auto-tune controller 150 then records the determined "cost" of applying the incremental bias adjustment 160 and removes the bias adjustment 160. The auto-tune controller 150 repeats the sensitivity step process for each parameter to be changed until it has recorded all changes to the cost function.

The auto-tune controller 150 determines or calculates the predicted incremental bias adjustments 160 needed to achieve an optimal operational state of the gas turbine engine 110 based on the completed sensitivity step process. For example, based on the sensitivity step process, the auto-tune controller 150 selects one or more incremental bias adjustments 160 that the auto-tune controller 150 determines will improve the performance of the gas turbine engine 110. The auto-tune controller 150 then performs an improvement step by applying the selected plurality of incremental bias adjustment 160 to the control system 170 to adjust the fuel flow fractions (e.g., fuel split values) to the plurality of fuel nozzles 200, 205, 210 simultaneously.

Once the improvement step is made, the entire cost function analysis process reiterates. That is, the steps of (a) monitoring and comparing the amplitude for a number of predetermined frequency bands to the predetermined limits, (b) performing a plurality of sensitivity steps to adjust performance of the gas turbine engine 110, (c) calculating a "cost" for each sensitivity step adjustment, (d) determining which bias adjustments are to be made in an improvement step (based on the sensitivity step process), and (e) making a plurality of incremental bias adjustments in a single improvement step are repeated until the cost function analysis has determined that the cost function is at a minimum value.

Figure 3:
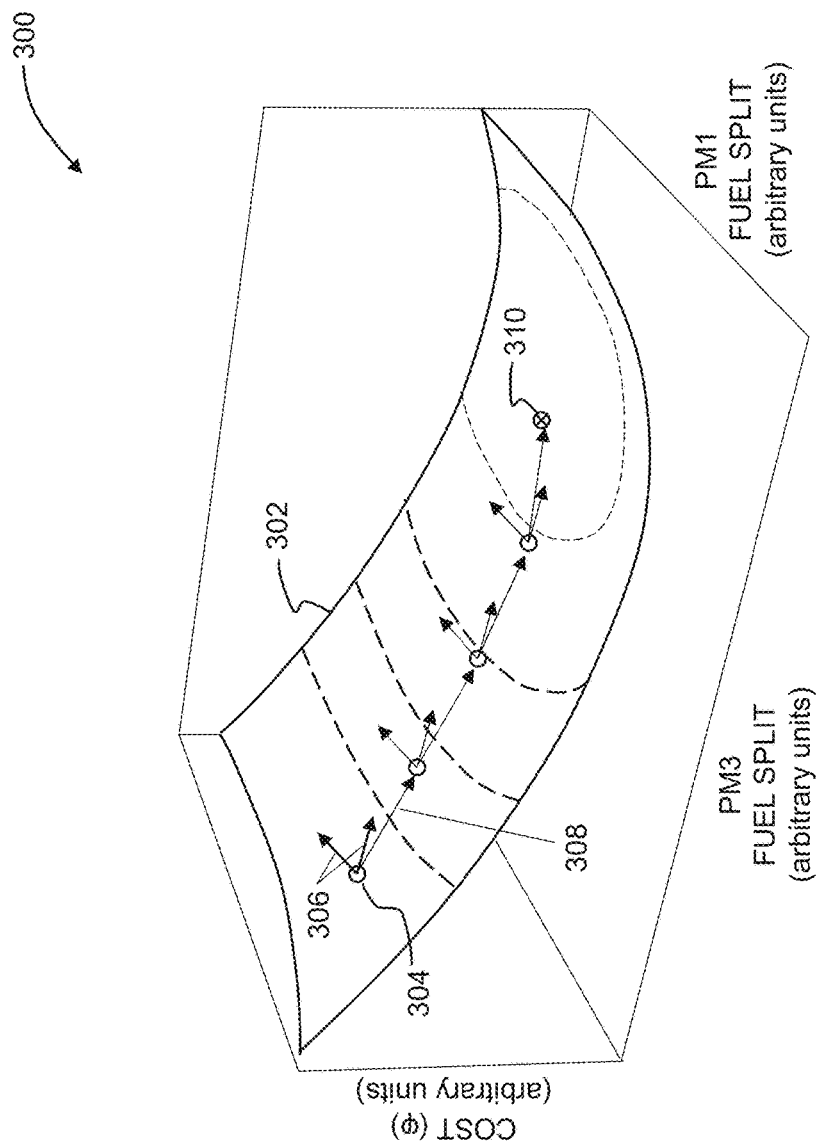
FIG. 3 is a graph that shows an example cost function of the gas turbine engine shown in FIG. 1.

FIG. 3 is a graph 300 that shows an example cost function 302 of the gas turbine engine 110. The graph represents a cost of operating the gas turbine engine 110 with respect to a fuel split for the center nozzle 200 (PM1) versus a fuel split for the three (3) outer nozzles 210 (PM3). Each point 304 represents an increased cost of operating the gas turbine engine 110 when a fuel split for the center nozzle 200 (PM1) is at a selected value and a fuel split for the three (3) outer nozzles 210 (PM3) is at a selected value. The arrows 306 represent the iterative sensitivity steps described above. The arrows 308 extending from a point 304 to an adjacent point represent the improvement steps describe above. As discussed, the sensitivity steps and improvement steps are repeated until the auto-tune controller 150 determines that the cost function is at a minimum, as indicated by point 310.

Figure 4:
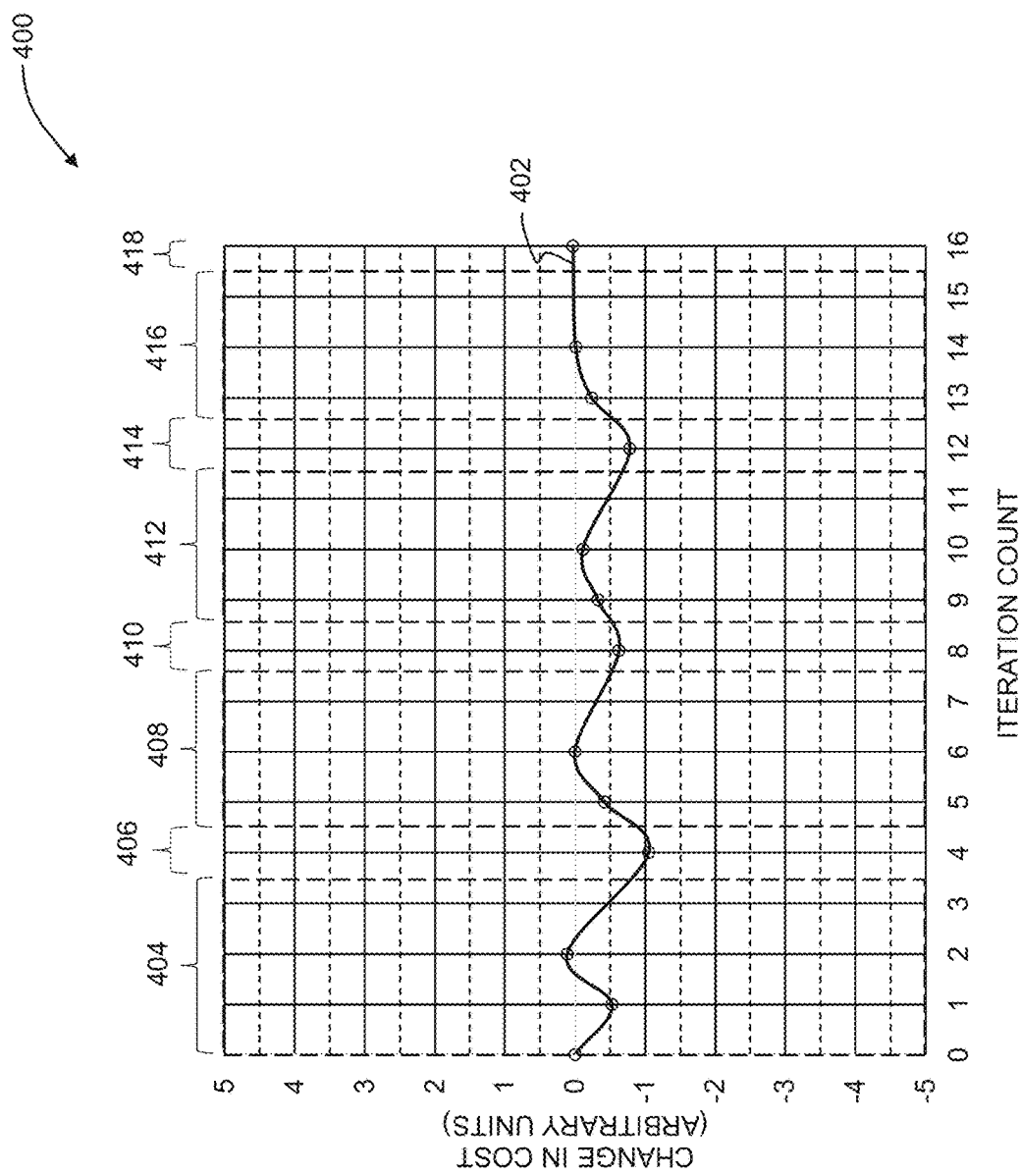
FIG. 4 is a graph that depicts a change in the cost function during iteration of a tuning process performed by an auto-tune controller of the system of FIG. 1.

FIG. 4 is a graph 400 that depicts a change in the cost function during iteration of a tuning process performed by the auto-tune controller 150. The graph plots the change in cost versus the iteration count of the tuning process. Line 402 represents a cost of the cost function at each iteration of the tuning process. In the example, section 404 represents the iterative sensitivity steps described above. The cost points at iteration one (1) and two (2) represent a change in cost based on a single bias adjustment being applied to a selected tuning parameter of the gas turbine engine 110. For example, the cost point at iteration one (1) may represent a negative fifty-three hundredths (−0.53) change in cost due to a bias adjustment to the fuel split of the center nozzle 200 (PM1). The cost point at iteration two (2) may represent a positive eleven hundredths (0.11) change in cost due to a bias adjustment to the fuel split of the three (3) outer nozzles 210 (PM3). Section 406 represents the iterative improvement steps described above. For example, after the auto-tune controller 150 determines which bias adjustments to apply based on the iterative sensitivity steps and applies them to the control system 170, the overall operating cost of the gas turbine engine 110 is adjusted. In the depicted example, the cost point at iteration step 4 (improvement step) may represent a negative one and five hundredths (−1.05) change in overall operating cost.

The process iterates as indicted in FIG. 4. For example, sections 408, 412, and 416 represent additional iterative sensitivity steps described above. Each iterative sensitivity step begins from the operating state of the gas turbine engine 110 after the immediately preceding improvement step. Each section 410, 414, and 418 represent an additional improvement step. As depicted in the graph 400, the cost function change is approaching zero (0) at iteration 16, such that there is little to no additional improvement in operating cost based on subsequent iterative sensitivity steps.

Exemplary Computer-Implemented Methods

Figure 5:
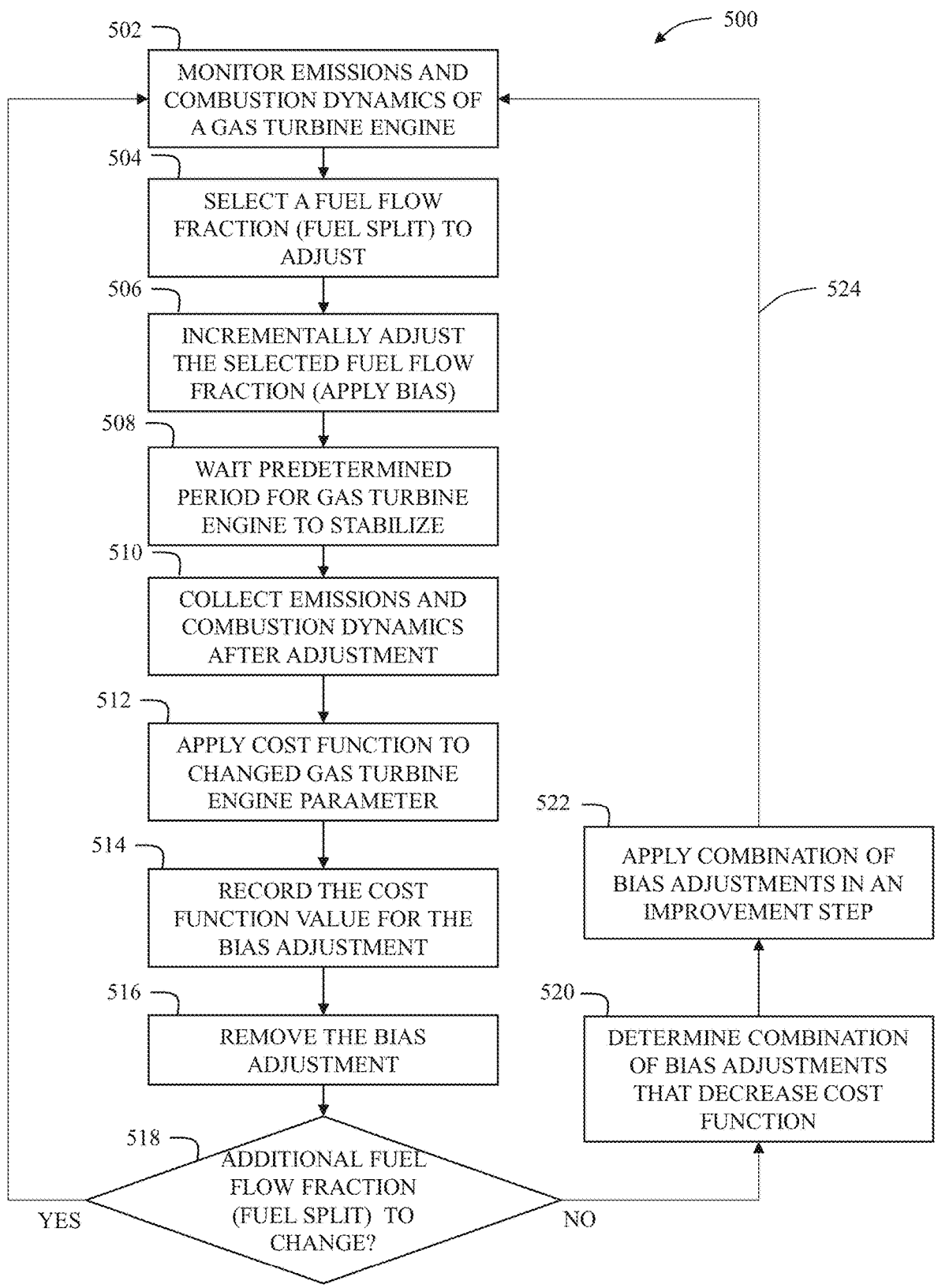
FIG. 5 is a flowchart illustrating an exemplary computer-implemented method for tuning a gas turbine engine, such as the gas turbine engine shown in FIG. 1.

FIG. 5 is a flowchart illustrating an exemplary computer-implemented method 500 for tuning a gas turbine engine, such as the gas turbine engine 110 (shown in FIG. 1). The operations described herein may be performed in the order shown in FIG. 5 or may be performed in a different order. Furthermore, some operations may be performed concurrently as opposed to sequentially. In addition, some operations may be optional.

The computer-implemented method 500 is described below, for ease of reference, as being executed by the exemplary devices and components introduced with the embodiments illustrated in FIGS. 1-4. In one embodiment, the method 500 may be implemented by the auto-tune controller 150 (shown in FIG. 1). In the exemplary embodiment, the method 500 relates to automatic tuning of the gas turbine engine 110 by reducing a cost function subject to a set of constraints. While operations within the method 500 are described below regarding the auto-tune controller 150, the method 500 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 502, the method 500 includes substantially continuously monitoring data that represents initial conditions of the emission composition 121 and the combustion dynamics 122 of the gas turbine engine 110 at an initial operating state. As discussed herein, in one embodiment, the combustion dynamics 122 are measured for the combustors 115 using the sensors 120 (e.g., pressure transducers) that communicate the measurement data to the acquisition component 131, for example, as first and second pressure signals. Similarly, the sensors 120 communicate the emission composition 121 (i.e., emissions) detected from the gas turbine engine 110. In some embodiments, the measurement data collected from the gas turbine engine 110 may include, but is not limited to, gas turbine parameters 123 and gas manifold pressures 124.

In certain aspects of the present invention, the data collected from the gas turbine engine 110 is normalized. For instance, the sensors 120 (e.g., the first and second pressure sensors described above) may be configured as pressure transducers that detect pressure fluctuations in the combustors 115 and report the fluctuations as the combustion dynamics 122. The fluctuations may be measured over a predetermined time period and transmitted to the acquisition component 131 in the form of a rolling average of pressure variability. Further, the emission composition 121 relates to a gas composition measured, for example, by one or more sensors 120 and/or other emissions-testing devices. Typically, the gas composition is determined by monitoring the concentrations levels of emissions (e.g., $NO_x$ and CO) and is collected and transmitted to the acquisition component 131.

In the exemplary embodiment, the auto-tune controller 150 performs one or more sensitivity steps to determine the effect of the respective sensitivity step on the operation of the gas turbine engine 110. In particular, at operation 504, the auto-tune controller 150 selects at least one fuel flow fraction or fuel split for adjustment (i.e., tuning parameters). The auto-tune controller 150 may select an appropriate fuel flow fraction or fuel split from one or more fuel flow fraction schedules associated with the control system 170. At operation 506, the selected fuel flow fraction is incrementally adjusted by a predetermined amount. For example, the auto-tune controller 150 may apply an incremental bias adjustment 160 to the control system 170 to adjust the selected fuel flow fraction by a small, fixed incremental adjustment. In the example embodiment, the incremental adjustment may be about twenty-five hundredths of a percent (0.25%) of the fuel flow fraction to be adjusted (i.e., the tuning parameter value). Incrementally adjusting the fuel flow fraction may be accomplished by the adjustment component 133 (shown in FIG. 1) transmitting an incremental bias adjustment 160 to the control system 170. In one embodiment, automatic valves on the combustors 115 adjust the fuel flow fraction for the associated fuel circuit(s) (not shown) in response to the incoming incremental bias adjustment 160. By incrementing a fuel flow fraction upwards or downwards by the predetermined incremental adjustment amount, a fuel flow distribution through the fuel nozzles 200, 205, 210, is altered. However, even though the fuel flow fraction is changed, the total fuel flow to the fuel circuit is generally held constant.

At operation 508, the auto-tune controller 150 waits a predetermined time period before acquiring and processing additional data extracted from the gas turbine engine 110. Waiting for the predetermined time period facilitates allowing the gas turbine engine 110 to stabilize at a second operational state. In the example embodiment, the predetermined time period is greater than or equal to about three minutes (3 min.).

At operation 510, the auto-tune controller 150 collects additional data that represents adjusted conditions of the emission composition 121 and the combustion dynamics 122 of the gas turbine engine 110 after application of the bias adjustment 160 (i.e., at the second operational state of the gas turbine engine 110). The auto-tune controller 150 then applies a cost function to the changed operating parameter ((e.g., $NO_x$, Lean Blow Out (LBO), Cold Tone (CT), Hot Tone (HT)) based on the bias adjustment 160, at operation 512. For example, the bias adjustment 160 may include a fuel split that causes one or more of the engine parameters (e.g., $NO_x$, Lean Blow Out (LBO), Cold Tone (CT), Hot Tone (HT), etc.) to change.

At operation 514, the auto-tune controller 150 records the determined "cost" of applying the incremental bias adjustment 160, for example, in a bias look-up table along with the bias adjustment 160. As the sensitivity step process continues, values included in the bias table are overwritten with new values that indicate lower cost of the cost function for a selected bias adjustment 160. Consequently, only the bias adjustment 160 with the lowest cost will be contained in the bias look-up table, and such value may be continuously updated during the iterative tuning process. At operation 516, the auto-tune controller 150 subsequently removes the bias adjustment 160 (i.e., ceases to transmit the bias adjustment to the controller system 170). The auto-tune controller 150 repeats the sensitivity step process for each fuel flow fraction or fuel split for adjustment (i.e., tuning parameters) to be changed until it has recorded all changes to cost function, as indicated at operation 518.

After each fuel flow fraction or fuel split for adjustment (i.e., tuning parameter) has been adjusted during the sensitivity step process, at operation 520, the auto-tune controller 150 determines what combination of incremental bias adjustments 160, when applied to the control system 170, will achieve an optimal operational state of the gas turbine engine 110, i.e., a lowest cost (minimum value) of the cost function. The combination of incremental bias adjustments 160 is based on the completed sensitivity step process described in operations 502-518 above. At operation 522, the auto-tune controller 150 performs an improvement step by applying the selected plurality of incremental bias adjustment 160 to the control system 170 to adjust the fuel flow fractions (e.g., fuel split values) to the plurality of fuel nozzles 200, 205, 210 simultaneously. After the improvement step is performed, the entire cost function method 500 reiterates with the final bias adjustments being the initial condition of the new iteration, as indicated at operation 524.

It is noted that when operating the gas turbine engine 110, the bias look-up table may be used to increase the operating performance of the gas turbine engine 110 because the bias adjustments contained therein are associated with a minimized cost function. It is noted that in certain aspects of the present invention, because the method 500 includes substantially continuously monitoring data that represents the combustion dynamics 122 and the emission composition 121 of the gas turbine engine 110, if the combustion dynamics 122 and/or the emission composition 121 reach a predetermined upper limit, the auto-tune controller 150 may fine-tune the bias adjustments 160 to maintain a minimized cost function while maintaining the combustion dynamics 122 and/or the emission composition 121 within specified limits. The auto-tune controller 150 may overwrite the recorded bias adjustment values 160 in the bias look-up table with the new values. As such, the method 500 allows the auto-tune controller 150 to maintain optimal performance of the gas turbine engine 110 as the ambient conditions changes and/or the gas turbine engine accumulates wear and tear.

Example Computing Systems

Figure 6:
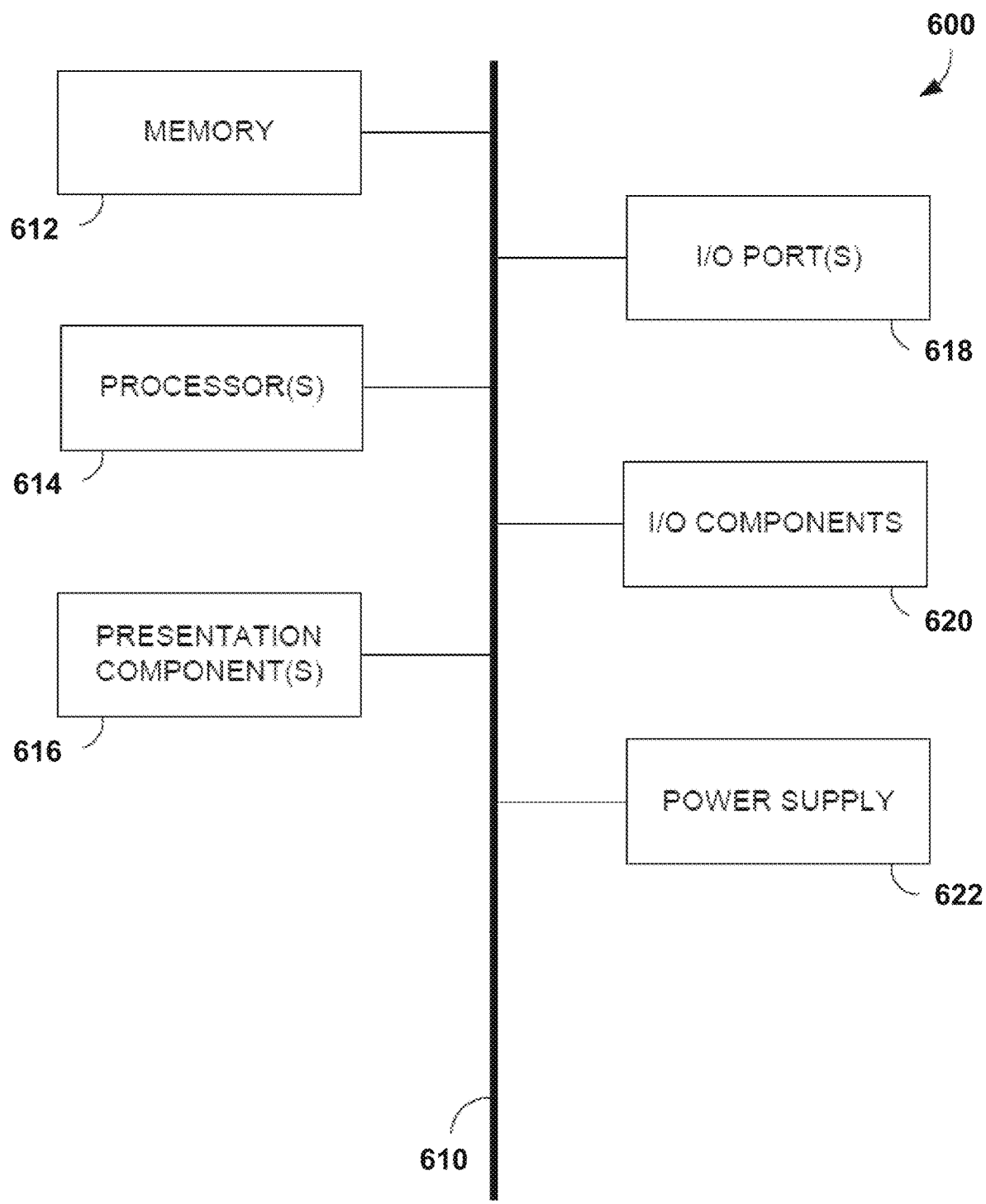
FIG. 6 is a schematic of an example computing device that can be used for implementing aspects of the present invention.

Referring now to FIG. 6, an exemplary operating environment which can be used for implementing embodiments described herein is shown and designated generally as computing device 600. Computing device 600 is but one example of a suitable computing environment and is not intended to suggest any limitation as to the scope of use or functionality of the invention. The computing device 600 should not be interpreted as having any dependency or requirement relating to any one or a combination of components illustrated.

In FIG. 6, computing device 600 includes a bus 610 that directly or indirectly couples the following devices: memory 612, one or more processors 614, one or more presentation components 616, input/output (I/O) ports 618, input/output (I/O) components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 6 is merely illustrative of an exemplary computing device that can be used in connection with one or more embodiments of the present invention, such as the computing device 140, the auto-tune controller 150, and/or the control system 170. Distinction is not made between such categories as "workstation," "server," "laptop," "hand-held device," etc., as all are contemplated as within the scope of FIG. 6 and when referencing the "computing device."

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in any variety of system configurations, including hand-held devices, consumer electronics, general-purpose computers, and more specialty computing devices, among others. The invention may also be practiced in distributed computing environments where tasks are performed by remote-processing devices that are linked through a communications network.

Computing device 600 may include a variety of computer-readable media and/or computer storage media. Computer-readable media may be any available media that can be accessed by computing device 600 and includes both volatile and non-volatile media, removable and non-removable media. By way of example and not limitation, computer-readable media may comprise computer storage media and communication media and/or devices. Computer storage media may include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computing device 600. These memory components can store data momentarily, temporarily, or permanently. Computer storage media does not include signals per se.

Communication media typically embodies computer-readable instructions, data structures, or program modules. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or non-volatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc. I/O ports 618 allow computing device 600 to be logically coupled to other devices including I/O components 620, some of which may be built in. Illustrative components include a microphone, joystick, game pad, satellite dish, scanner, printer, wireless device, and the like.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or executable instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor or controller, may be implemented as special purpose or as general purpose. For example, the processor or controller may include a general-purpose central processing unit (CPU), a graphics processing unit (GPU), a microcontroller, a reduced instruction set computer (RISC) processor, an application specific integrated circuit (ASIC), a field-programmable gate array (FPGA), a programmable logic circuit (PLC), and/or any other circuit or processor capable of executing the functions described herein. The processor or controller may also include programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor," "processing unit," "controller," or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at different times. Software may accordingly configure the processor to constitute a particular hardware configuration at one instance of time and to constitute a different hardware configuration at a different instance of time.

The methods described herein may be encoded as executable instructions embodied in a computer-readable medium, including, without limitation, a storage device, and/or a memory device. Generally, the computer-readable medium stores, at least temporarily, a plurality of computer software components that are executable by a processor. Such instructions, when executed by a processor, cause the processor to perform at least a portion of the methods described herein.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. A method, implemented by a processor, for tuning a gas turbine engine, said method comprising:
performing a sensitivity step process on a tuning parameter of the gas turbine engine comprising:
monitoring an operating parameter of the gas turbine engine, wherein the gas turbine is operating in a first operational state and the operating parameter has an initial condition;
selecting the tuning parameter of the gas turbine engine for adjustment;
adjusting the selected tuning parameter of the gas turbine engine by a predefined amount to generate a biased tuning parameter, the adjusting comprising applying an incremental bias adjustment to a fuel flow fraction schedule;
adjusting operation of the gas turbine engine to a second operational state based on the biased tuning parameter, wherein the operating parameter has an adjusted condition;
applying the adjusted condition and the initial condition of the operating parameter to a cost function;
determining that the cost function results in a cost function value indicative of a decreased cost; and
writing the incremental bias adjustment and the cost function value to a bias look-up table, wherein the incremental bias adjustment and the cost function value are associated with the selected tuning parameter.

2. The method in accordance with claim 1,
said operation of performing the sensitivity step process further comprising, after writing the incremental bias adjustment and the cost function value to the bias look-up table, adjusting operation of the gas turbine engine to the first operational state by removing the incremental bias adjustment from the fuel flow fraction schedule.

3. The method in accordance with claim 2,
wherein the tuning parameter comprises a plurality of tuning parameters, the sensitivity step process repeating for each respective tuning parameter,
wherein the bias look-up table includes a respective incremental bias adjustment and a respective cost function value associated with each respective tuning parameter.

4. The method in accordance with claim 3, further comprising determining a combination of incremental bias adjustments from the bias look-up table that results in a minimum cost function value.

5. The method in accordance with claim 4, further comprising applying the combination of incremental bias adjustments to the fuel flow fraction schedule.

6. The method in accordance with claim 5,
wherein the operating parameter comprises a plurality of operating parameters, the sensitivity step process repeating for each respective operating parameter,
wherein, for each respective operating parameter, the bias look-up table includes a respective incremental bias adjustment and a respective cost function value associated with each respective tuning parameter.

7. The method in accordance with claim 1, wherein the operating parameter of the gas turbine engine comprises one or more of the following: combustion dynamics and emission compositions.

8. The method in accordance with claim 1,
said operation of performing the sensitivity step process further comprising, directly after adjusting operation of the gas turbine engine, waiting a predetermined time period to allow the gas turbine engine to stabilize at the second operational state.

9. The method in accordance with claim 8, wherein the predetermined time period is greater than or equal to three minutes.

10. The method in accordance with claim 1, wherein the incremental bias adjustment is twenty-five hundredths of a percent (0.25%) of a value of the selected tuning parameter.

11. A system comprising:
an auto-tune controller; and
one or more sensors coupled to a gas turbine engine, the one or more sensors configured to transmit one or more operating parameters associated with the gas turbine engine to the auto-tune controller, wherein the auto-tune controller comprises a memory and a processor, the memory storing computer-executable instructions that, when executed by the processor, cause the processor to perform operations comprising:
performing a sensitivity step process on a tuning parameter of the gas turbine engine comprising:
monitoring an operating parameter of the gas turbine engine, wherein the gas turbine is operating in a first operational state and the operating parameter has an initial condition;
selecting the tuning parameter of the gas turbine engine for adjustment;
adjusting the selected tuning parameter of the gas turbine engine by a predefined amount to generate a biased tuning parameter, the adjusting comprising applying an incremental bias adjustment to a fuel flow fraction schedule;
adjusting operation of the gas turbine engine to a second operational state based on the biased tuning parameter, wherein the operating parameter has an adjusted condition;
applying the adjusted condition and the initial condition of the operating parameter to a cost function;
determining that the cost function results in a cost function value indicative of a decreased cost; and
writing the incremental bias adjustment and the cost function value to a bias look-up table, wherein the incremental bias adjustment and the cost function value are associated with the selected tuning parameter.

12. The system in accordance with claim 11,
said operation of performing the sensitivity step process further comprising, after writing the incremental bias adjustment and the cost function value to the bias look-up table, adjusting operation of the gas turbine engine to the first operational state by removing the incremental bias adjustment from the fuel flow fraction schedule.

13. The system in accordance with claim 12,
wherein the tuning parameter comprises a plurality of tuning parameters, the sensitivity step process repeating for each respective tuning parameter,
wherein the bias look-up table includes a respective incremental bias adjustment and a respective cost function value associated with each respective tuning parameter.

14. The system in accordance with claim 13,
said computer-executable instructions further configured to cause the processor to perform an operation comprising determining a combination of incremental bias adjustments from the bias look-up table that results in a minimum cost function value.

15. The system in accordance with claim 14, said computer-executable instructions further configured to cause the processor to perform an operation comprising applying the combination of incremental bias adjustments to the fuel flow fraction schedule.

16. The system in accordance with claim 15, wherein the operating parameter comprises a plurality of operating parameters, said computer-executable instructions further configured to cause the processor to repeat the sensitivity step process for each respective operating parameter,
wherein, for each respective operating parameter, the bias look-up table includes a respective incremental bias adjustment and a respective cost function value associated with each respective tuning parameter.

17. The system in accordance with claim 11, wherein the operating parameter of the gas turbine engine comprises one or more of the following: combustion dynamics and emission compositions.

18. The system in accordance with claim 11, said computer-executable instructions further configured to cause the processor to perform an operation comprising, directly after adjusting operation of the gas turbine engine, waiting a predetermined time period to allow the gas turbine engine to stabilize at the second operational state.

19. The system in accordance with claim 18, wherein the predetermined time period is greater than or equal to three minutes.

20. The system in accordance with claim 11, wherein the incremental bias adjustment is twenty-five hundredths of a percent (0.25%) of a value of the selected tuning parameter.

21. A method for tuning a gas turbine engine, said method comprising:
performing a sensitivity step process on a tuning parameter of the gas turbine engine comprising:
monitoring an operating parameter of the gas turbine engine, wherein the gas turbine is operating in a first operational state and the operating parameter has an initial condition;
selecting the tuning parameter of the gas turbine engine for adjustment;
adjusting the selected tuning parameter of the gas turbine engine by a predefined amount to generate a biased tuning parameter, the adjusting comprising applying an incremental bias adjustment to a fuel flow fraction schedule;
adjusting operation of the gas turbine engine to a second operational state based on the biased tuning parameter, wherein the operating parameter has an adjusted condition;
applying the adjusted condition and the initial condition of the operating parameter to a cost function;
determining that the cost function results in a cost function value indicative of a decreased cost; and
writing the incremental bias adjustment and the cost function value to a bias look-up table, wherein the incremental bias adjustment and the cost function value are associated with the selected tuning parameter.

22. The method in accordance with claim 21, said operation of performing the sensitivity step process further comprising, after writing the incremental bias adjustment and the cost function value to the bias look-up table, adjusting operation of the gas turbine engine to the first operational state by removing the incremental bias adjustment from the fuel flow fraction schedule.

23. The method in accordance with claim 22, wherein the tuning parameter comprises a plurality of tuning parameters, the sensitivity step process repeating for each respective tuning parameter,
wherein the bias look-up table includes a respective incremental bias adjustment and a respective cost function value associated with each respective tuning parameter.

24. The method in accordance with claim 23, further comprising determining a combination of incremental bias adjustments from the bias look-up table that results in a minimum cost function value.

25. The method in accordance with claim 24, further comprising applying the combination of incremental bias adjustments to the fuel flow fraction schedule.

26. The method in accordance with claim 25, wherein the operating parameter comprises a plurality of operating parameters, the sensitivity step process repeating for each respective operating parameter,
wherein, for each respective operating parameter, the bias look-up table includes a respective incremental bias adjustment and a respective cost function value associated with each respective tuning parameter.

27. The method in accordance with claim 21, wherein the operating parameter of the gas turbine engine comprises one or more of the following: combustion dynamics and emission compositions.

28. The method in accordance with claim 21, said operation of performing the sensitivity step process further comprising, directly after adjusting operation of the gas turbine engine, waiting a predetermined time period to allow the gas turbine engine to stabilize at the second operational state.

29. The method in accordance with claim 28, wherein the predetermined time period is greater than or equal to three minutes.

30. The method in accordance with claim 21, wherein the incremental bias adjustment is twenty-five hundredths of a percent (0.25%) of a value of the selected tuning parameter.

* * * * *